United States Patent
Hongo et al.

(10) Patent No.: US 8,215,490 B2
(45) Date of Patent: Jul. 10, 2012

(54) DEVICE FOR CLASSIFYING PARTICLES AND METHOD FOR CLASSIFYING PARTICLES

(75) Inventors: Kazuya Hongo, Kanagawa (JP); Tetsuo Ohta, Kanagawa (JP); Hiroshi Kojima, Kanagawa (JP); Seiichi Takagi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 175 days.

(21) Appl. No.: 12/731,705

(22) Filed: Mar. 25, 2010

(65) Prior Publication Data
US 2011/0017645 A1 Jan. 27, 2011

(30) Foreign Application Priority Data

Jul. 22, 2009 (JP) ................................. 2009-170977

(51) Int. Cl.
*B03B 5/00* (2006.01)

(52) U.S. Cl. ...................... 209/172.5; 209/156; 209/173

(58) Field of Classification Search .................. 209/155, 209/156, 172.5, 173, 208
See application file for complete search history.

(56) References Cited

U.S. PATENT DOCUMENTS

| | | | |
|---|---|---|---|
| 4,147,621 A * | 4/1979 | Giddings | 210/637 |
| 4,250,026 A * | 2/1981 | Giddings et al. | 209/155 |
| 5,932,100 A * | 8/1999 | Yager et al. | 210/634 |
| 6,109,119 A * | 8/2000 | Jiang et al. | 73/865.5 |
| 6,139,684 A * | 10/2000 | Lawson et al. | 162/55 |
| 7,328,807 B2 * | 2/2008 | Takagi et al. | 209/172.5 |
| 7,732,725 B2 * | 6/2010 | Takagi et al. | 209/131 |
| 2003/0040119 A1 | 2/2003 | Takayama et al. | |
| 2004/0000519 A1* | 1/2004 | Jiang et al. | 210/634 |
| 2006/0070921 A1 | 4/2006 | Takagi et al. | |
| 2006/0118479 A1* | 6/2006 | Shevkoplyas et al. | 210/433.1 |
| 2010/0193407 A1* | 8/2010 | Steinberg et al. | 209/155 |
| 2011/0011776 A1* | 1/2011 | Hongo et al. | 209/157 |
| 2011/0042279 A1* | 2/2011 | Moriya et al. | 209/155 |

FOREIGN PATENT DOCUMENTS

| | | |
|---|---|---|
| JP | A 2004-154747 | 6/2004 |
| JP | A 2004-330008 | 11/2004 |
| JP | A 2006-116520 | 5/2006 |
| JP | A 2007-14860 | 1/2007 |

OTHER PUBLICATIONS

Seki et al., "Development of Particle Classification Method Using Microchannels," *Society for Chemistry and Micro-Nano Systems*, vol. 4, No. 2, Mar. 2006, pp. 11-16 (with Abstract).

Ohkawara et al., "The Influence of Channel Depth on the Performance of a Micro-Separator/Classifier," *Kagaku Kogaku Ronbunshu*, The Society of Chemical Engineers, Japan, vol. 30, No. 2, Mar. 2006, pp. 134-140 (with partial translation).

Huh et al., "A Gravity-Driven Microfluidic Particle Sorting Device with Hydrodynamic Separation Amplification," *Anal. Chem.*, vol. 79, No. 4, Feb. 15, 2007, pp. 1369-1376.

* cited by examiner

Primary Examiner — Joseph C Rodriguez
(74) Attorney, Agent, or Firm — Oliff & Berridge, PLC

(57) ABSTRACT

A classification device includes: a classification channel for classifying particles; a particle dispersion delivery channel as defined herein; a conveying fluid feed channel as defined herein; and at least one collection channel as defined herein, and the particle dispersion delivery channel satisfying relationship (1):

$$A < B$$

wherein A is a width of the particle dispersion inlet port as measured perpendicular to the flow in the classification channel on a cross-section taken parallel to the flow in the classification channel; and B is a width of the junction between the particle dispersion delivery channel and the classification channel as measured perpendicular to the flow in the classification channel on a cross-section taken parallel to the flow in the classification channel.

16 Claims, 12 Drawing Sheets

DEVICE FOR CLASSIFYING PARTICLES AND METHOD FOR CLASSIFYING PARTICLES

CROSS-REFERENCE TO RELATED APPLICATIONS

This application is based on and claims priority under 35 USC 119 from Japanese Patent Application No. 2009-170977 filed on Jul. 22, 2009.

BACKGROUND

Technical Field

This invention relates to a device and a method for classifying particles.

SUMMARY

According to an aspect of the invention, there is provided a classification device including: a classification channel for classifying particles, a particle dispersion delivery channel for delivering a particle dispersion to the upper stream in the classification channel, the particle dispersion delivery channel having a particle dispersion inlet port for introducing the particle dispersion at one end thereof with the other end thereof communicating with the classification channel at a junction, a conveying fluid feed channel for introducing a conveying fluid to the lower stream in the classification channel, the conveying fluid feed channel having an opening for introducing the conveying fluid at one end thereof and the other end communicating with the classification channel, and at least one collection channel for collecting separated particles, the collection channel having an opening at one end thereof with the other end communicating with the classification channel, the particle dispersion delivery channel satisfying relationship (1):

$$A < B$$

wherein A is the width of the particle dispersion inlet port as measured perpendicular to the flow in the classification channel on a cross-section taken parallel to the flow in the classification channel; and B is the width of the junction between the particle dispersion delivery channel and the classification channel as measured perpendicular to the flow in the classification channel on a cross-section taken parallel to the flow in the classification channel.

BRIEF DESCRIPTION OF THE DRAWINGS

Exemplary embodiments of the present invention will be described in detail based on the following figures, wherein.

| [Description of Numerals and Symbols] | |
|---|---|
| 100 | Classification device |
| 110 | Classification channel |
| 120 | Particle dispersion delivery channel |
| 121 | Particle dispersion inlet port |
| 130 | Conveying fluid feed channel |
| 131 | Conveying fluid inlet port |
| 140 | Collection channel (=collection channel 1) |
| 141 | Collection channel (=collection channel 2) |
| 150 | Junction |
| 180 | Stirring bar |
| 181 | Stirrer |
| R | Particle dispersion |
| S | Conveying fluid |
| T1 | Coarse particle fraction |
| T2 | Fine particle fraction |

DETAILED DESCRIPTION

The classification device according to the first aspect of the invention includes a classification channel for classifying particles, a particle dispersion delivery channel that delivers a particle dispersion to the upper stream in the classification channel, a conveying fluid feed channel for introducing a conveying fluid to the lower stream in the classification channel, and a collection channel for collecting separated particles. The particle dispersion delivery channel has a particle dispersion inlet port for introducing the particle dispersion at one end thereof with the other end communicating with the classification channel via a junction. The conveying fluid feed channel has, at one end thereof, an opening for introducing the conveying fluid with the other end communicating with the classification channel. The collection channel has an opening at one end thereof with the other end communicating with the classification channel. The particle dispersion delivery channel satisfies relationship (1): $A<B$, wherein A is the width of the particle dispersion inlet port as measured perpendicular to the flow in the classification channel on a cross-section taken parallel to the flow in the classification channel; and B is the width of the junction between the particle dispersion delivery channel and the classification channel as measured perpendicular to the flow in the classification channel on a cross-section taken parallel to the flow in the classification channel.

The device of the invention will be described in detail with appropriate reference to the accompanying drawings. Unless otherwise noted, the same numerals or symbols designate the same components.

Figure 1:
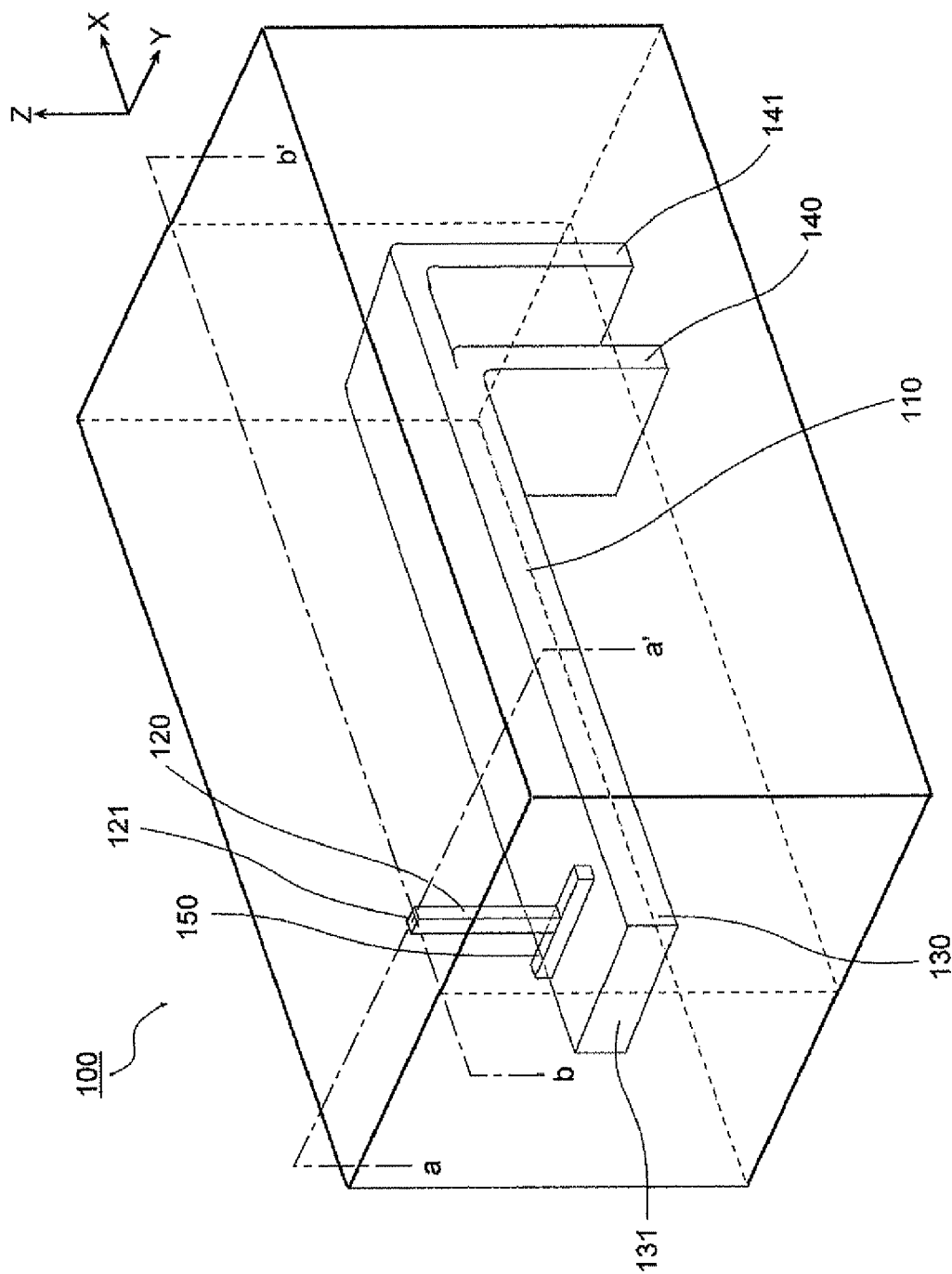
FIG. 1 is a schematic perspective of an embodiment of the classification device according to the invention.

FIG. 1 is a schematic perspective of a classification device 100 incorporating an exemplary embodiment of the invention.

The device 100 shown in FIG. 1 includes a classification channel 110 that conveys a particle dispersion and a conveying fluid in laminar flow having the particle dispersion in the upper stream and the conveying fluid in the lower stream.

A particle dispersion delivery channel 120 and a conveying fluid feed channel 130 are provided upstream of the classification channel 110. The particle dispersion delivery channel 120 has an opening for introducing a particle dispersion (hereinafter referred to as a particle dispersion inlet port) 121 at one end thereof with the other end communicating with the upper stream of the classification channel 110. The conveying fluid feed channel 130 has an opening for introducing a conveying fluid (a conveying fluid inlet port) 131 at one end thereof with the other end communicating with the lower stream of the classification channel 110.

The classification channel 110 conveys the particle dispersion and the conveying fluid in laminar flow having the particle dispersion in the upper stream and the conveying fluid in the lower stream. Particles in the particle dispersion settle by gravity while being conveyed in the classification channel 110. When the particles present in the particle dispersion have uniform specific gravity, gravity will cause rapider sedimentation of larger particles than smaller ones while being carried downstream in the classification channel 110 according to Stokes equation. Downstream of the classification channel 110 is provided at least one collection channel 140 for collecting the separated (classified) particles with its one end open and the other end connected to the classification channel. While the device illustrated in FIG. 1 has two collection channels 140 and 141, the number of the collection channels is not limited to two as long as there is at least one collection channel. It is preferred that two or more collection channels be provided.

The device 100 of the present embodiment also includes a junction 150 between the particle dispersion delivery channel 120 and the classification channel 110. The junction will also be referred to as an auxiliary channel for a particle dispersion or simply as an auxiliary channel.

The particle dispersion delivery channel satisfies relationship (1):

$$A < B$$

wherein A is the width of the particle dispersion inlet port as measured perpendicular to the flow in the classification channel on a cross-section taken parallel to the flow in the classification channel; and B is the width of the junction between the particle dispersion delivery channel and the classification channel as measured perpendicular to the flow in the classification channel on a cross-section taken parallel to the flow in the classification channel.

Figure 2:
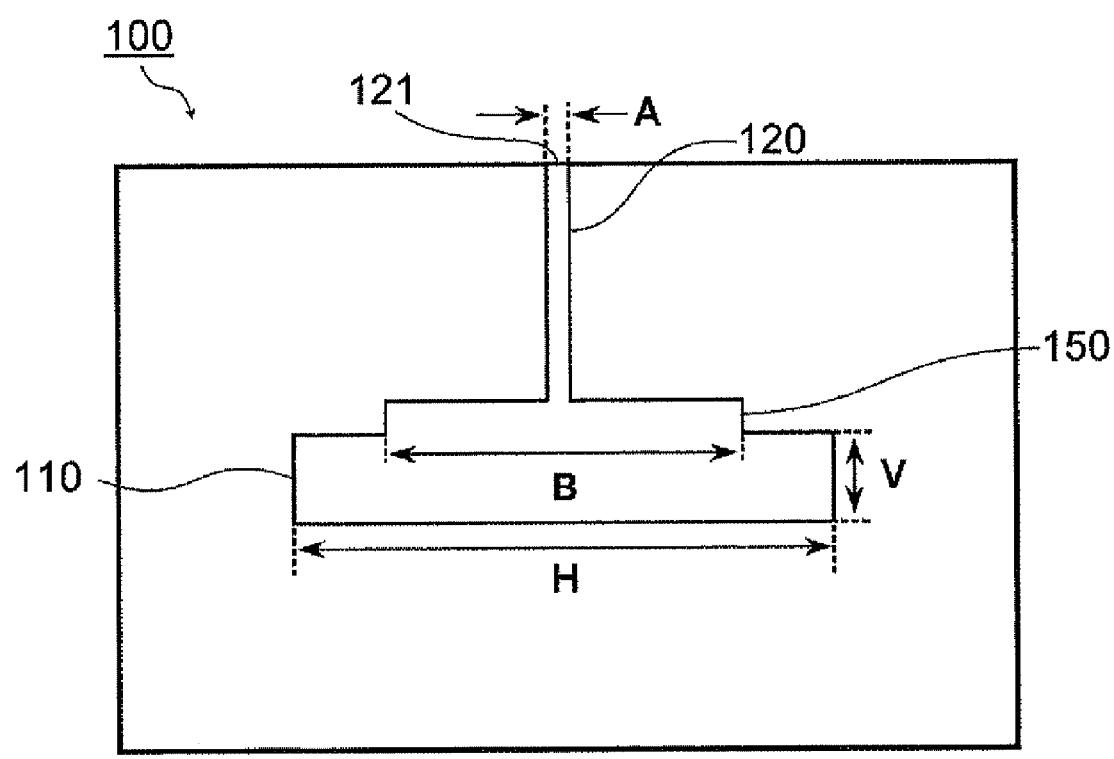
FIG. 2 is a cross-section taken along line a-a' in FIG. 1.

FIG. 2 is a cross-section taken along line a-a' in FIG. 1. In FIG. 2 symbol A represents the width of the particle xxx dispersion inlet port 121 as measured perpendicular to the flow in the classification channel 110 on the cross-section taken parallel to the flow in the classification channel 110, and symbol B represents the width of the junction 150 between the particle dispersion delivery channel 120 and the classification channel 110 as measured perpendicular to the flow in the classification channel 110 on a cross-section taken parallel to the flow in the classification channel 110.

With A being smaller than B as illustrated in FIG. 2, the particle dispersion delivery channel has its width increased at the junction with the classification channel so that the particle dispersion is introduced through a wider channel into the classification channel.

As a result of intensive investigations, the present inventors have found that an increase in particle concentration of the particle dispersion accelerates sedimentation of the particles by the influences of displacement flow, resulting in reduction of classification accuracy. To put it more specifically, when a particle settles out, a fluid moves to fill the empty space where the particle has existed. In the case where the particle concentration is sufficiently low, the displacement flow gives little influence because it occurs through the gap between particles. As the particle concentration increases, the distance between particles decreases so that the displacement flow is unable to flow between particles, and the particles in the dispersion move in a somewhat grouped state by the displacement flow effect. As a result, sedimentation of particles proceeds at a velocity higher than the terminal settling velocity calculated from the Stokes equation.

By the provision of the auxiliary channel, the particle dispersion spreads widely across the flow direction when it flows into the classification channel. The influence of the displacement flow is thus lessened to achieve higher classification accuracy.

It is preferred that A and B satisfy relationship (3):

$$2A < B < H$$

wherein A and B are as defined above; and H is the width of the classification channel as measured in the horizontal direction on a cross-section of the classification channel taken perpendicular to the flow in the classification channel. In other words, A of the particle dispersion inlet port is preferably less than 1/2 B of the auxiliary channel. A is more preferably 1/2.2 or less times B, even more preferably 1/2.5 or less times B. When A and B satisfy relationship (3), the upper limit of the classifiable concentration of a particle dispersion is high, and the rate of increase in throughput capacity of the device is large.

B is preferably less than H, more preferably 0.95 or less times H, even more preferably 0.9 or less times H. When B is less than H, machining to make the channels is easy. The flow in the classification channel assumes a parabolic velocity profile, i.e., plane Poiseuille flow. That is, the velocity reaches the maximum in the middle of the channel and is reduced close to the two side walls of the channel. Particles present close to the side walls are not practically conveyed by the flow but settle by gravity. Therefore, with B being less than H, particles are prevented from spreading up to the side walls of the classification channel to achieve improved classification accuracy.

In the present embodiment, it is also preferred that the aspect ratio of the classification channel's width (horizontal dimension) H to vertical dimension V satisfy relationship (2):

$$1/1 < H/V < 10/1$$

That is, in the present embodiment, the classification channel 110 has a cross-section wider than tall.

The aspect ratio H/V is more preferably larger than 1.5 and smaller than 9.5. When H/V is larger than 1, the upper limit of the classifiable concentration of a particle dispersion is high, providing high separation efficiency. With H/V being less than 10, the flow rate of fluid is low enough to collect a highly concentrated fluid.

The vertical dimension V, which means the depth of the classification channel, should be sufficient to maintain the laminar flow. V is preferably about 10 to about 5,000 μm, more preferably about 50 to about 4,000 μm, even more preferably about 100 to about 3,500 μm.

In the present embodiment, it is preferred that the dimension of the particle dispersion inlet port and the dimension of the junction between the particle dispersion delivery channel and the classification channel satisfy relationship (4):

$$Lb \leq La$$

wherein La is the dimension of the particle dispersion inlet port as measured along the flow direction in the classification channel on a cross-section taken parallel to the flow in the classification channel; and Lb is the dimension of the junction measured along the flow direction in the classification channel on a cross-section taken parallel to the flow in the classification channel.

Figure 3:
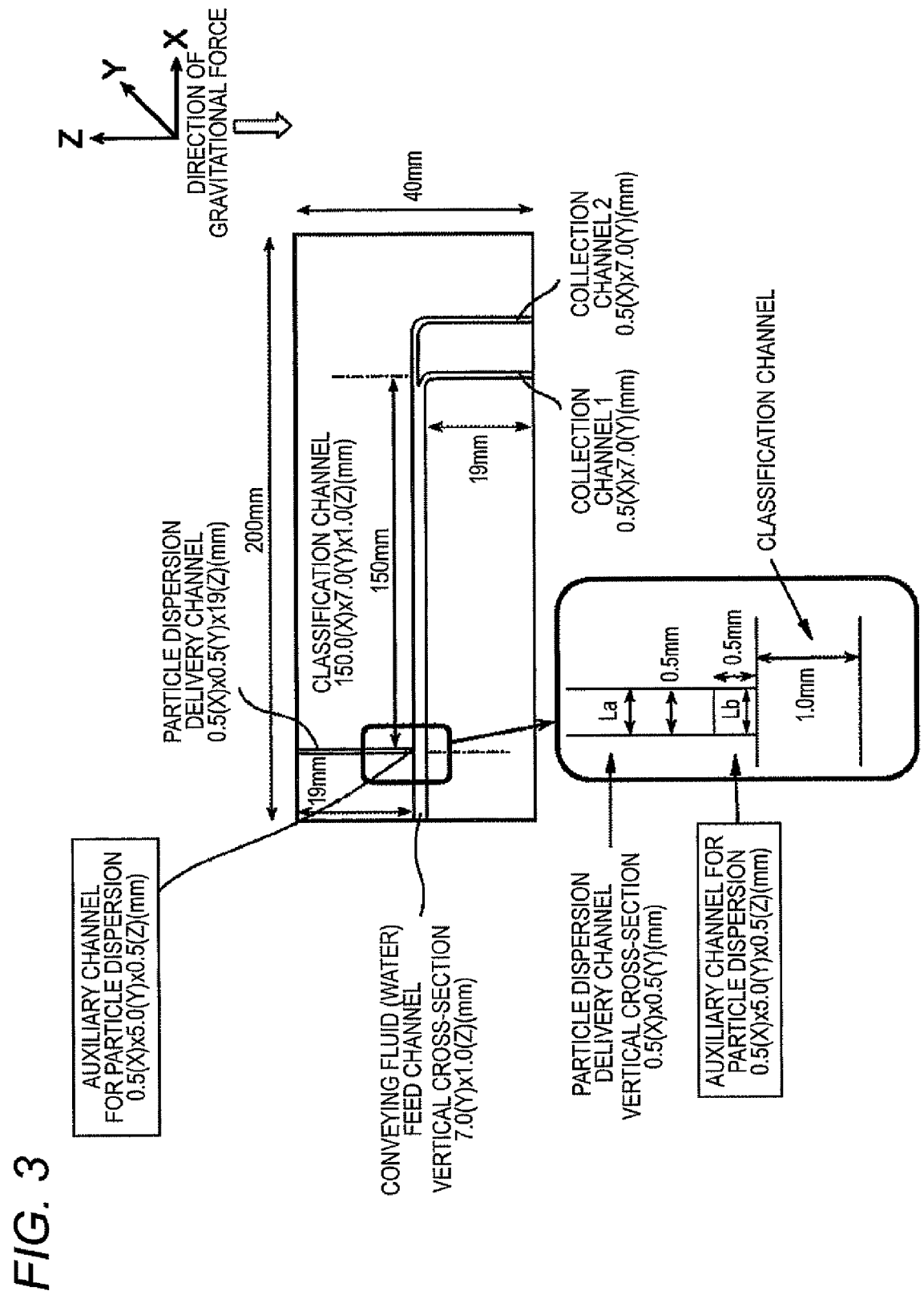
FIG. 3 is a cross-section taken along line b-b' in FIG. 1.

A cross-section taken along line b-b' in FIG. 1 is shown in FIG. 3, in which the dimension of the particle dispersion inlet port measured along the flow in the classification channel is indicated by symbol La, and the dimension of the junction (auxiliary channel for particle dispersion) measured along the flow in the classification channel is indicated by symbol Lb.

When Lb is equal to or less than La, the particle dispersion delivered through the particle dispersion delivery channel is sufficiently spread transversely to provide increased classification accuracy. When Lb is less than La, a shoulder is formed at the junction, and the shoulder can allow particles to accumulate thereon and cause clogging. It is advisable, therefore, that the auxiliary channel or the junction of the auxiliary channel to the particle dispersion delivery channel be tapered.

Figure 4A:
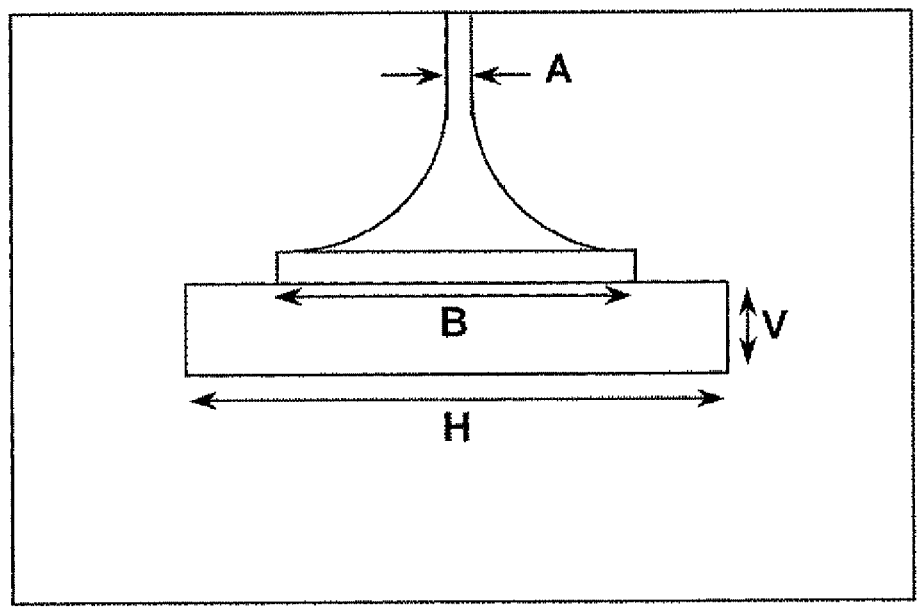
FIG. 4A and FIG. 4B each provide a cross-section of an embodiment of the classification device according to the invention.
Figure 4B:
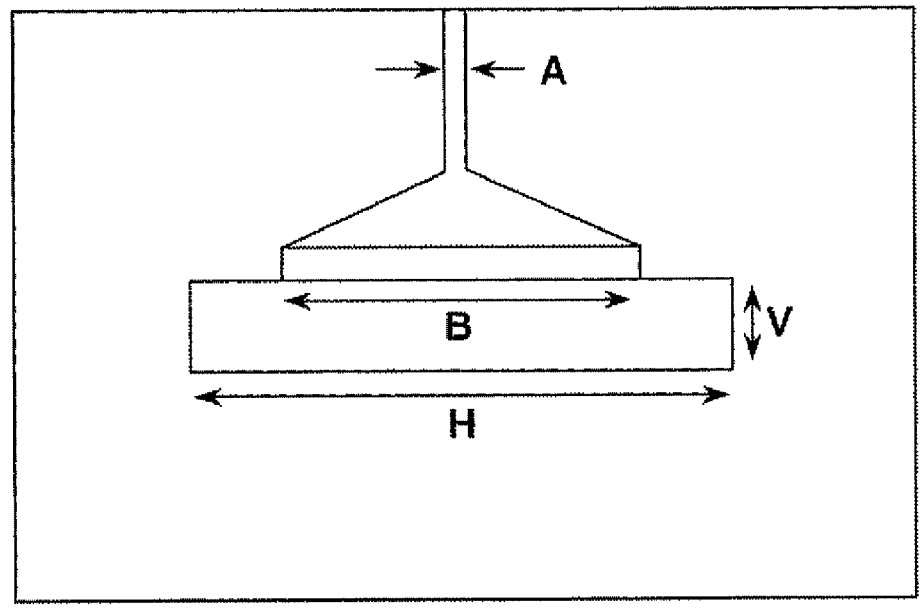

FIG. 4A and FIG. 4B each illustrates another embodiment of the classification device according to the invention. FIGS. 4A and 4B are each equivalent to FIG. 2, showing a cross-section taken along line a-a' in FIG. 1. In these embodiments, the channel for a particle dispersion is tapered downwardly to increase the channel width from A (the width of the particle dispersion delivery inlet port) to B (the width of the junction).

A presumed mechanism of the classification device of the invention will be explained in comparison with a relevant conventional technique.

Figure 10:
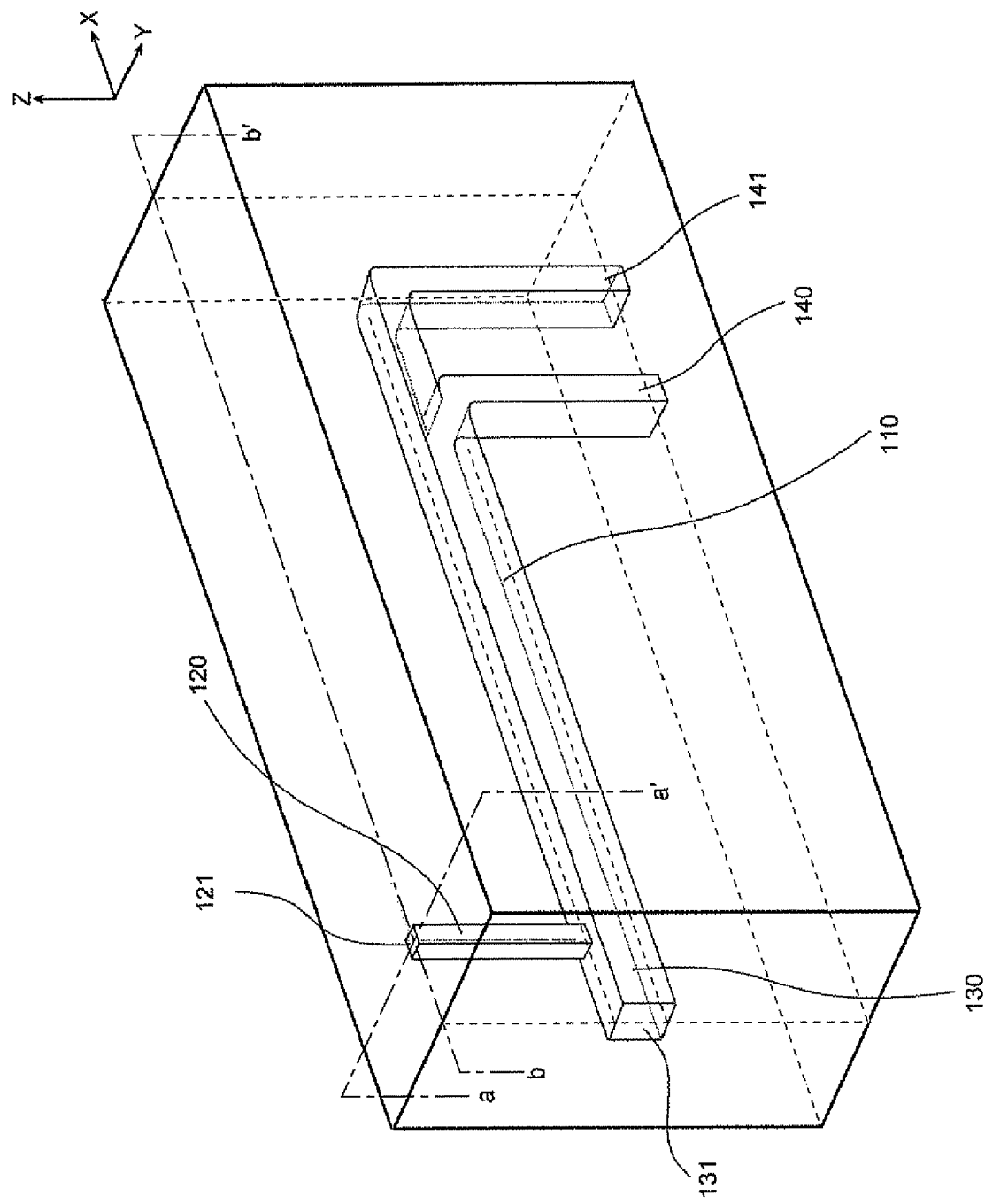
FIG. 10 is a schematic perspective of a conventional classification device.
Figure 11:
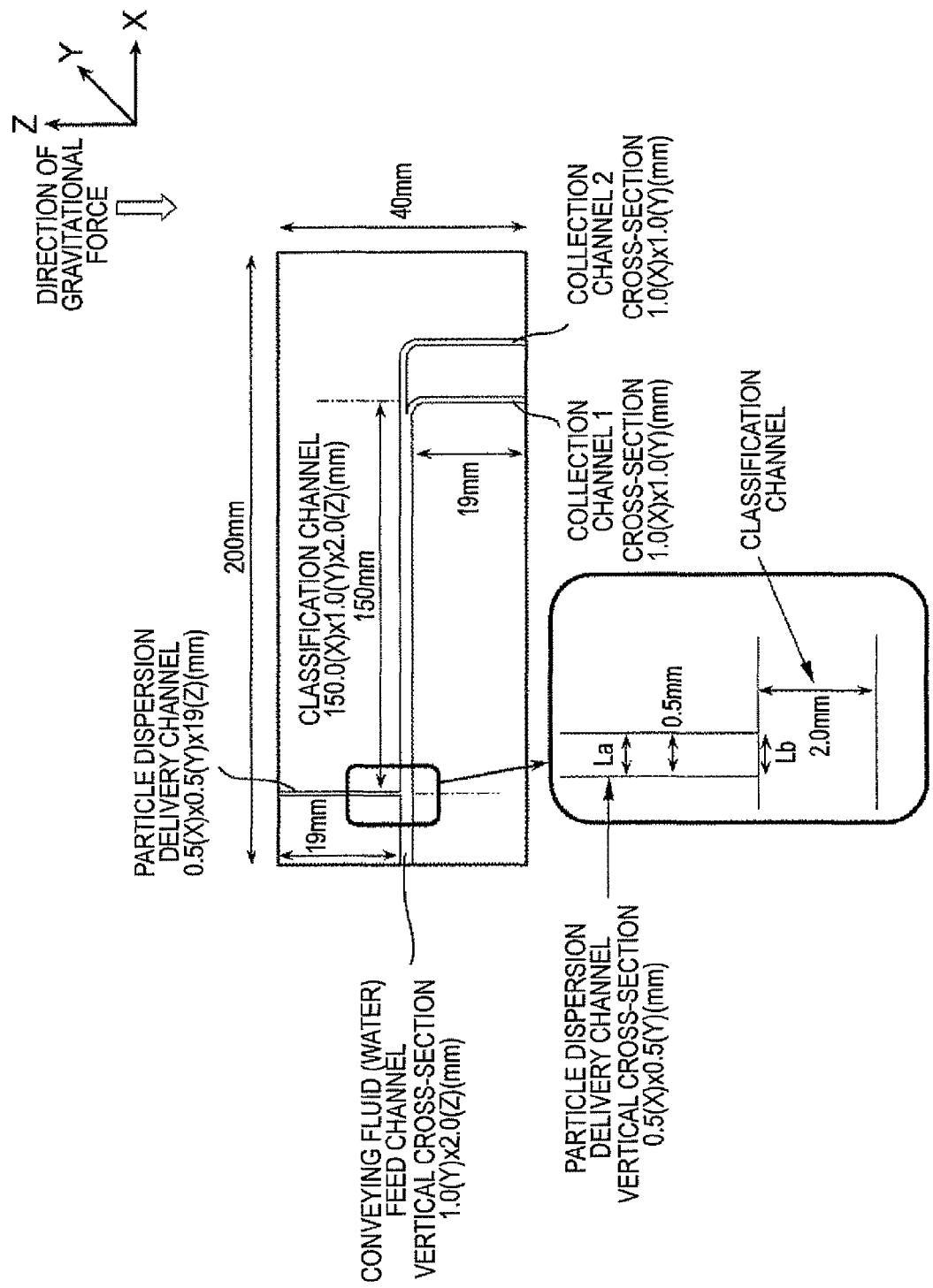
FIG. 11 is a cross-section taken along line a-a' in FIG. 10.
Figure 12:
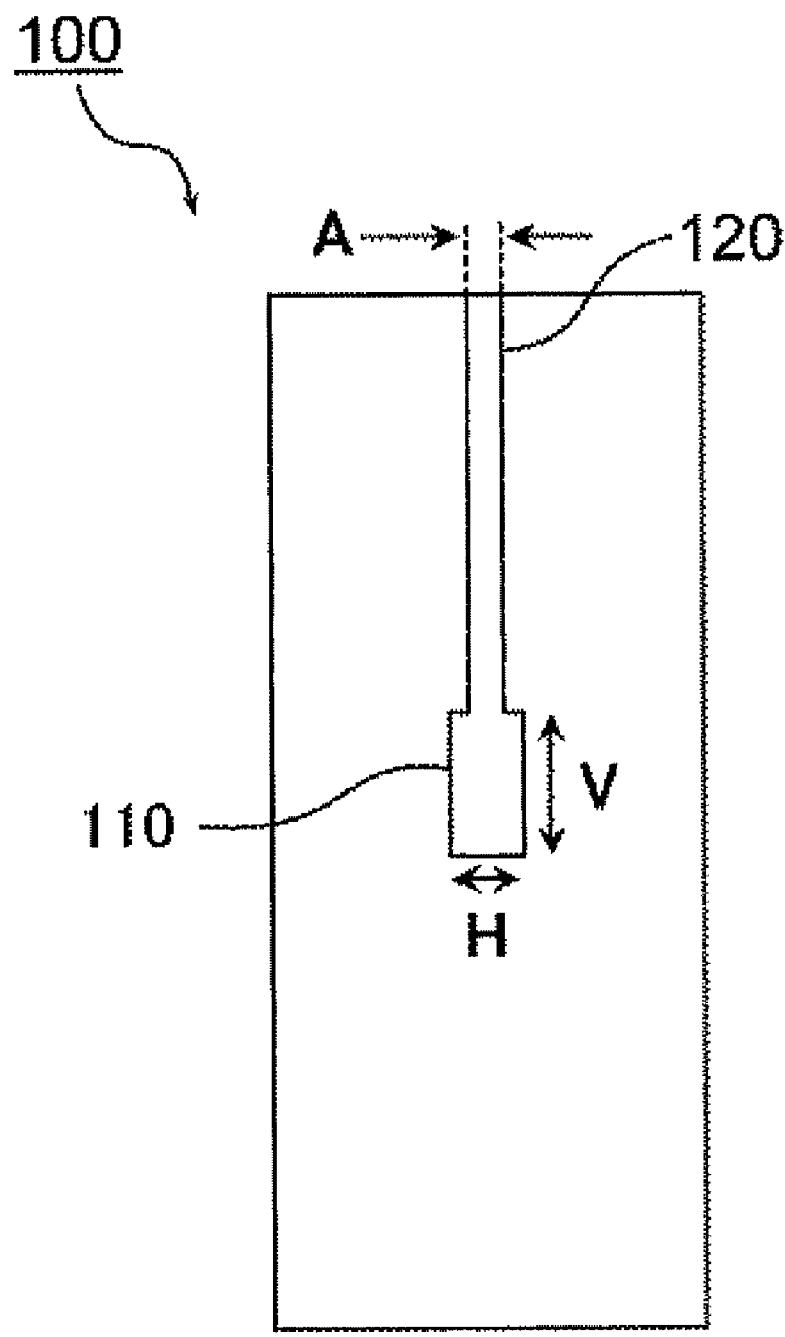
FIG. 12 is a cross-section taken along line b-b' in FIG. 10.

FIG. 10 is a schematic perspective of a conventional classification device having no auxiliary channel. FIG. 11 is a cross-section taken along line a-a' in FIG. 10. FIG. 12 is a cross-section taken along line b-b' in FIG. 10.

The device of FIG. 10 has a particle dispersion delivery channel 120 having an opening at one end thereof and a conveying fluid feed channel 130 having an opening at one end thereof both communicating with a classification channel 110 and is designed to make a laminar flow in the classification channel 110 such that a particle dispersion flows as an upper stream and a conveying fluid flows as a lower stream.

The present inventors have found that, when a particle dispersion having a relatively high concentration is passed through the classification device of FIG. 10, a displacement flow (i.e., a flow of a dispersion medium accompanying sedimentation of a particle to fill the empty space where the particle has existed) occurs downwardly. It is considered that the downward displacement flow acts as an outer force to accelerate sedimentation of particles in addition to gravitation force. As a result of intensive study, the inventors have discovered that the influence of such a displacement flow is lessened by conveying a particle dispersion in a classification channel having an increased width and thus reached the present invention. Furthermore, it is believed that, because a particle dispersion is gradually diluted in the auxiliary channel, an abrupt increase in sedimentation velocity that is observed particularly with a high concentration particle dispersion is controlled.

It is preferred that any of the classification channel, the particle dispersion delivery channel, the conveying fluid feed channel, and the collection channel(s) be a microfluidic channel. That is, the classification device of the invention is preferably composed of a plurality of microscale channels.

A microscale channel has a small size and a low flow velocity. A Reynolds number (Re) of the flow in the classification device according to the invention is 2,300 or less. Accordingly, the device of the invention is of the type not governed by turbulent flow as in the case of an ordinary classification device or apparatus but by laminar flow.

As used herein, the term "Reynolds number (Re)" is a dimensionless number represented by equation: $Re=uL/v$, where u is a flow velocity; L is a representative length; and v is a dynamic velocity.

In the field governed by laminar flow, particles dispersed in a liquid medium (dispersion medium) and heavier than the medium settle through the medium. The sedimentation velocity of the particles varies depending on the specific gravity or size of the particles. In the invention, the difference in sedimentation velocity is made use of to effect classification. The mechanism described is particularly suited to classify particles varying in size because the sedimentation velocity is proportional to the square of the particle size so that the larger the particle size the rapider the particles settle. On the other hand, in the case where the channel has a large hydraulic diameter to produce a turbulent flow, the position of particles' sedimentation varies, basically resulting in a failure of classification.

The length of the auxiliary channel and that of the classification channel are decided as appropriate to the level of difficulty of particle classification, for example, the breadth of particle size distribution or difference in specific gravity between liquid medium and particles. In general, when the difference between the specific gravity of the liquid medium and the conveying fluid and the specific gravity of particles to be classified is small, it is preferred to increase the length of the classification channel.

The channels may have any cross-sectional shape, such as rectangular, trapezoidal, circular, or the like. A rectangular shape is preferred in view of ease of fabricability and machinability.

Figure 5:
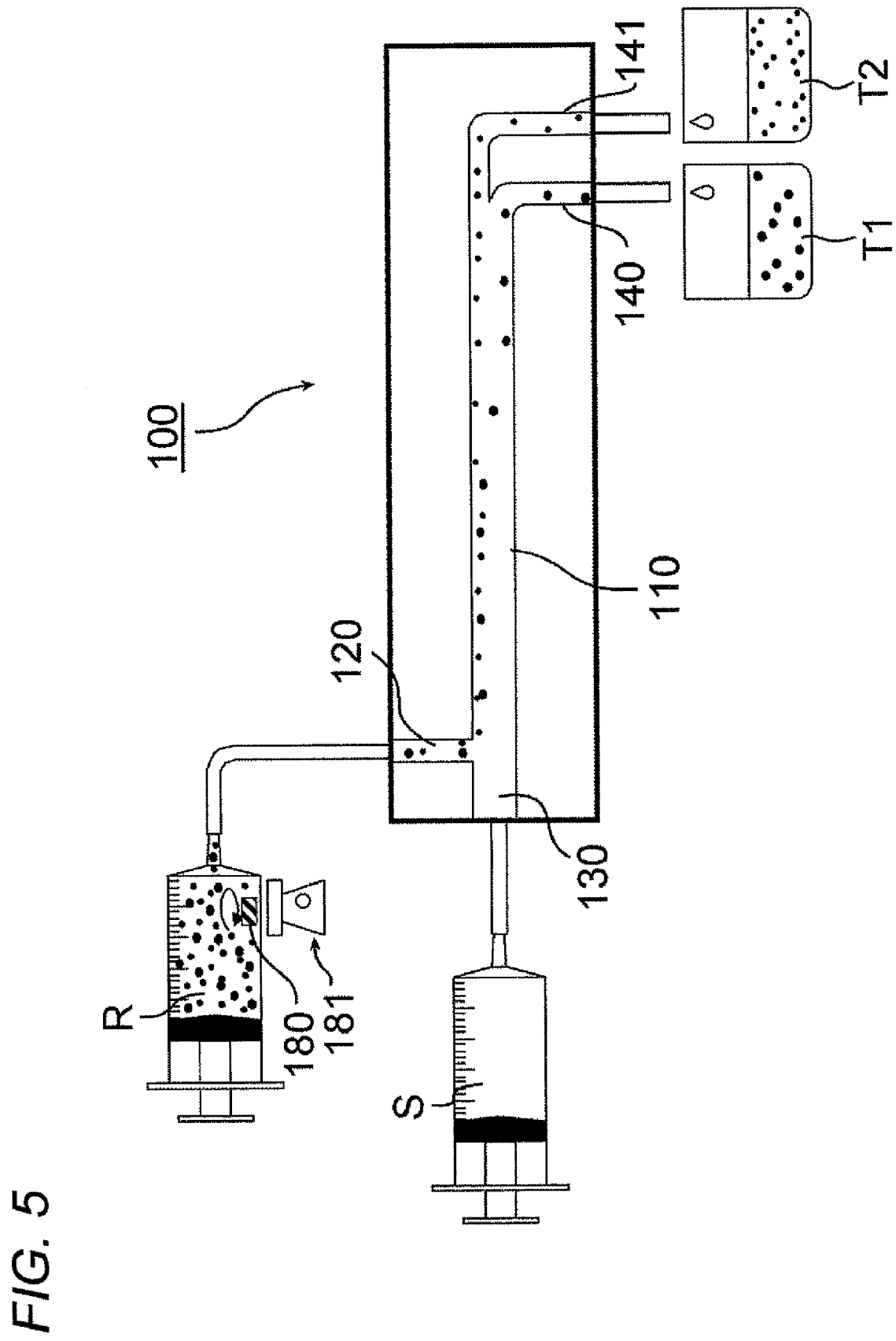
FIG. 5 illustrates a system including a classification device of the invention.

FIG. 5 illustrates a system including the classification device of the present embodiment. In the system of FIG. 5, the classification device 100 of FIG. 1 is arranged so that the flow in the classification channel is horizontal. The auxiliary channel is omitted from FIG. 5.

In FIG. 5, a particle dispersion R is placed in a syringe. The syringe is equipped with a stirring bar 180 that is rotated by a stirrer 181 outside the syringe so that the particle dispersion may be delivered in a uniform state. If the particle dispersion is left to stand still in the syringe, the particles settle out, making it difficult to feed a uniform particle dispersion. Therefore, the particle dispersion is preferably fed while being stirred, ultrasonicated, shaken, or in other ways.

A conveying fluid S is placed in another syringe.

The particle dispersion R and the conveying fluid S are delivered to the classification device 100 by a syringe pump (not shown).

In FIG. 5, the conveying fluid S is made to flow in a horizontal direction (i.e., at 90° with respect to the vertical direction); the flow of the particle dispersion R in the particle dispersion delivery channel 120 is vertical; and the flow in the classification channel 110 is horizontal.

In FIG. 5, when the particle dispersion R containing coarse particles and fine particles is delivered to the classification channel 110, the coarse particles settle rapider than the fine particles and are therefore collected through the collection channel 140 that is provided upstream the collection channel 141, whereas the fine particles that settle slower are collected through the collection channel 141. Thus, there are obtained a coarse particle fraction T1 (a collected fluid having a higher content of coarse particles than the particle dispersion delivered) through the collection channel 140 and a fine particle fraction T2 (a collected fluid having a higher content of fine particles than the particle dispersion delivered) through the collection channel 141.

Figure 6:
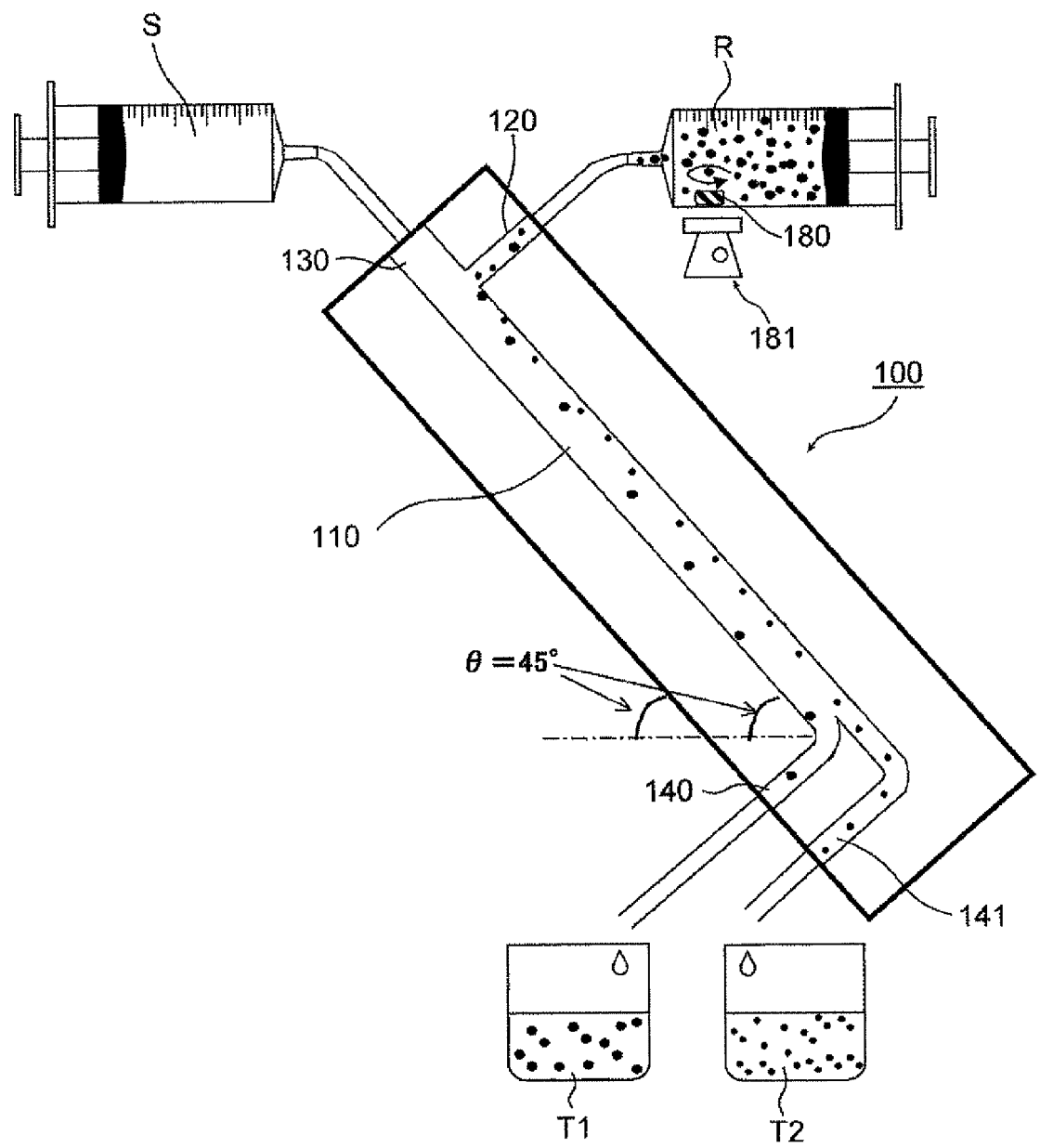
FIG. 6 illustrates another system including the classification device of the invention.

FIG. 6 illustrates another system including the classification device of the present embodiment.

Unlike the system of FIG. 5, the system of FIG. 6 has the classification channel 110 set at an angle θ with respect to the horizontal. In carrying out particle classification with the device of the invention, the particle dispersion R is preferably made to flow downward in the inclined classification channel 110, which is advantageous for the following reason. In the case where the dispersion is conveyed in a horizontal direction, the particles having settled in the classification channel can accumulate on the bottom of the classification channel. In a microfluidic channel, in particular, the flow velocity on the wall of the channel is almost zero, easily allowing the particles to accumulate. When the bottom surface of the classification channel is inclined as in the system of FIG. 6, the particles having settled thereon move downward along the bottom surface by the gravitational influence, whereby accumulation of the particles and resultant clogging of the channel can be prevented.

The direction of the flow in the particle dispersion delivery channel is preferably inclined from the horizontal so that the dispersion may flow downward, particularly in the direction of gravitational force. Taking the horizontal angle as 0° and the angle of the direction of gravitational force as 90°, the angle of the flow in the particle dispersion delivery channel is preferably greater than 0° and not greater than 135°, more preferably 10° to 120°, even more preferably 20° to 110°. By designing the particle dispersion delivery channel to make a fluid flow at an angle greater than 0°, channel clogging by the particles is prevented. The clogging problem is least likely to occur at an angle of 90°.

The angle of the flow in the classification channel is preferably greater than 0° and smaller than 90°, more preferably 10° to 80°, even more preferably 20° to 70°, most preferably 30° to 60°. As stated above, particles having settled on the bottom wall of the classification channel are conveyed downward successfully in a flow with an angle greater than 0°. With the angle of the flow being less than 90°, good classification accuracy is secured.

Similarly to the flow of the particle dispersion delivery channel, the angle of the flow in the collection channels is preferably greater than 0° and not greater than 90°, more preferably 10° to 90°, even more preferably 20° to 90°, and most preferably 90° (i.e., the direction of gravitational force). With the angle of the flow being 90°, the clogging problem is least likely to occur.

The direction of the flow of the conveying fluid through the conveying fluid feed channel, where a particle-free conveying liquid is delivered, is not particularly limited.

Figure 7:
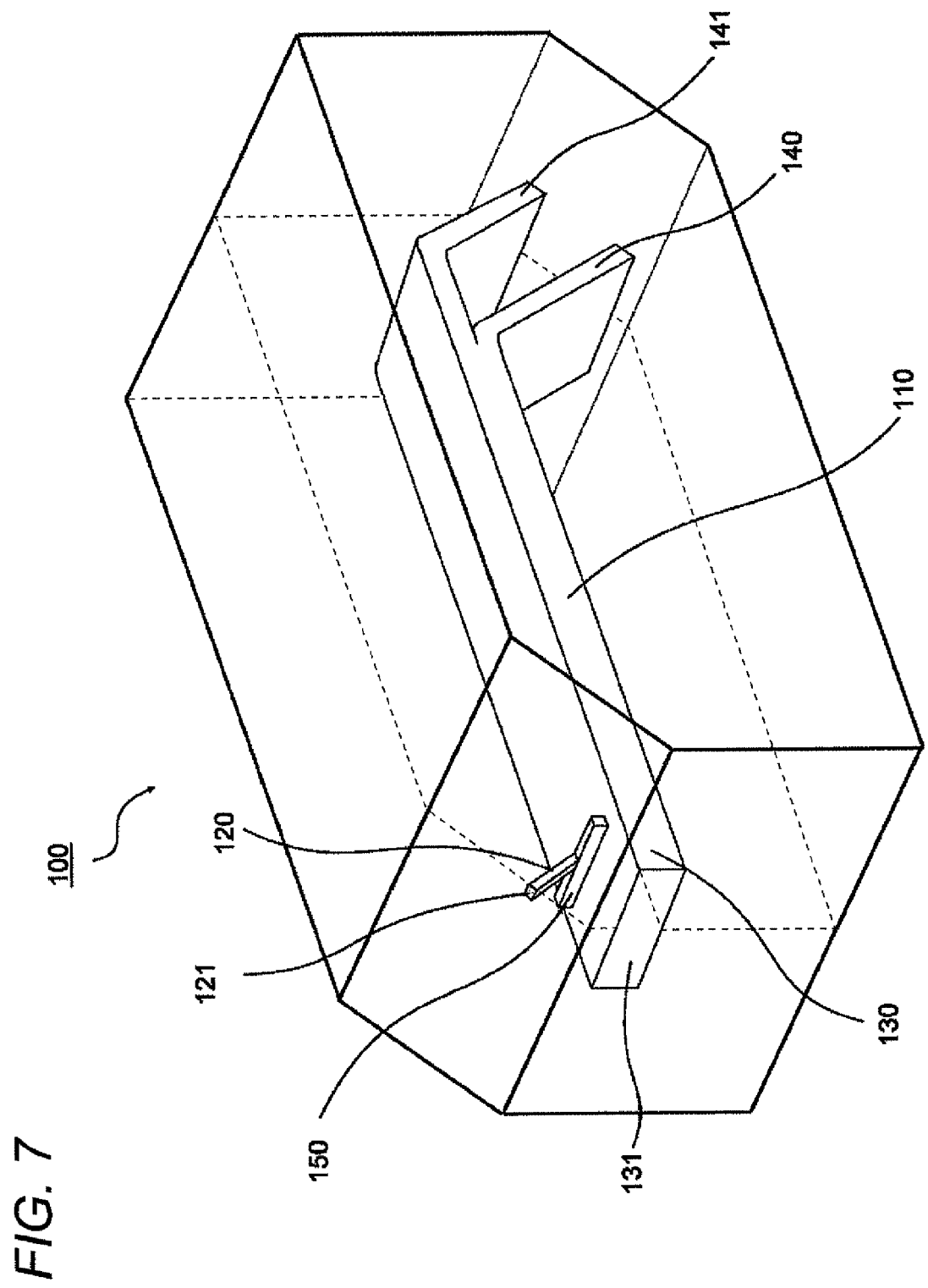
FIG. 7 is a schematic perspective of still another embodiment of the classification device according to the invention.
Figure 8:
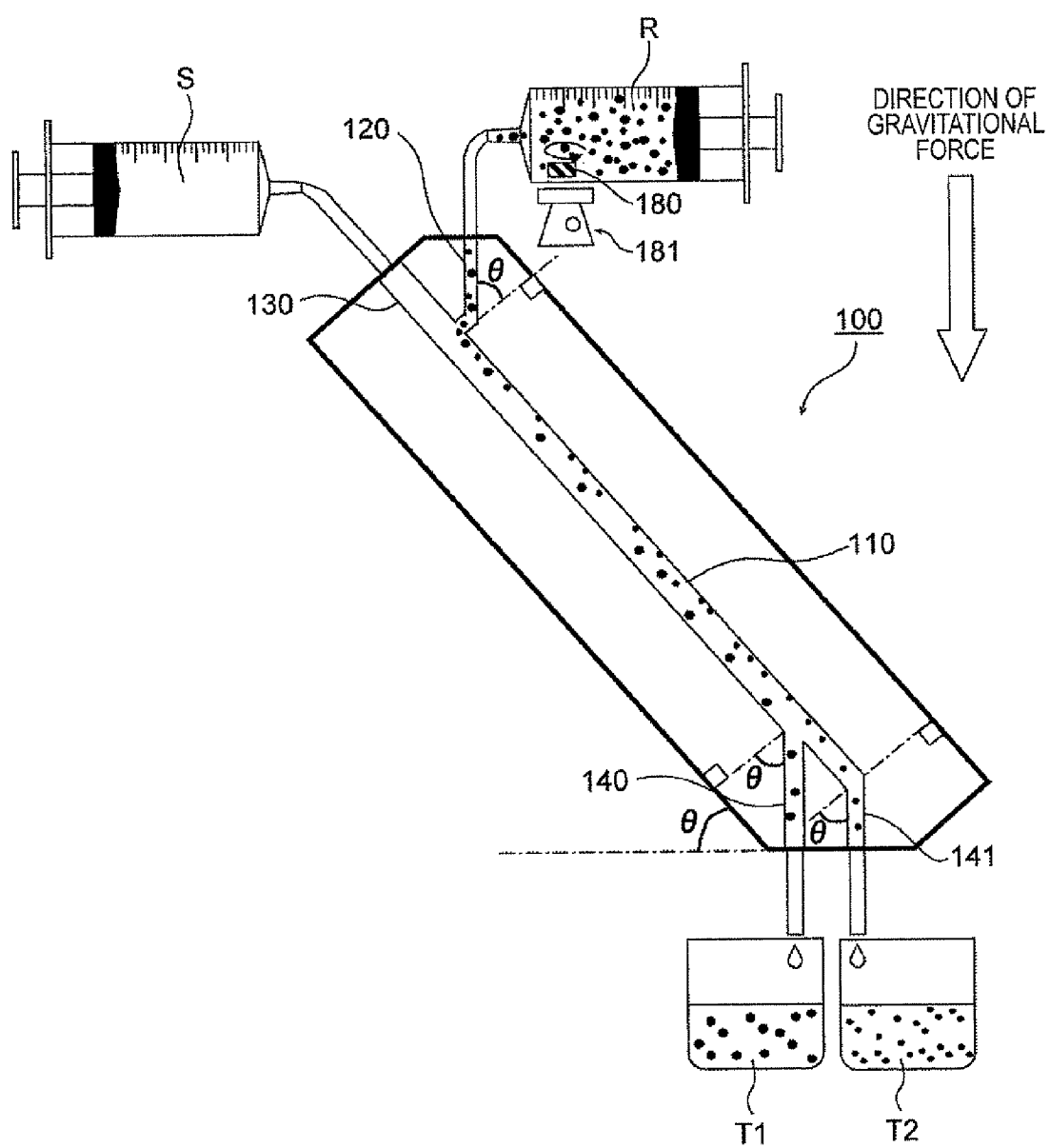
FIG. 8 illustrates a system including the classification device of FIG. 7.

FIG. 7 is a schematic perspective of still another embodiment of the classification device according to the invention. FIG. 8 illustrates a system including the device of FIG. 7.

It is preferred that the classification device of the invention have the particle dispersion delivery channel and the collection channel(s) inclined as illustrated in FIG. 7 so that, when the flow direction of the classification channel is tilted at an angle θ, both the flow direction of the particle dispersion delivery channel and that of each collection channel may be vertical as illustrated in FIG. 8. By this design, the clogging problem in the particle dispersion delivery channel and the collection channels are prevented effectively, and the clogging problem in the classification channel is also prevented effectively.

The particle dispersion and the conveying fluid may be introduced into the particle dispersion delivery channel and the conveying fluid feed channel, respectively, by any method but are preferably introduced under pressure using, e.g., a microsyringe, a rotary pump, a screw pump, a centrifugal pump, a piezoelectric pump, a gear pump, a mohno pump, a plunger pump, or a diagram pump.

The flow velocity of the particle dispersion in the particle dispersion delivery channel is preferably 0.01 to 5,000 ml/hr, more preferably 0.05 to 4,000 ml/hr.

The flow velocity of the conveying fluid in the conveying fluid feed channel is preferably 0.02 to 10,000 ml/hr, more preferably 0.05 to 8,000 ml/hr.

The material making the classification device is not particularly limited and may be chosen as appropriate for, for example, the liquid medium to be conveyed from among generally employed materials, such as metals, ceramics, plastics, and glass.

The classification device of the invention may be made by any known method. For example, the device may be fabricated from solid substrates using established micromachining technology. Materials that can be used as a solid substrate include metals, silicon, Teflon™, glass, ceramics, and plastics. Preferred of them are metals, silicon, Teflon, glass, and ceramics in view of their resistance to heat, pressure, and solvent and transparency to light. Glass is the most preferred.

Examples of micromachining technology include methods described in *Microreactor Shinjidaino Gouseigijutu*, supervised by Junichi Yoshida, CMC Publishing Co., Ltd. (2003) and *Bisaikakougijutu Ohyohen—Photonics Electronics Mechatronics eno Ohyo*, edited by Gyouji Iinkai of The Society of Polymer Science, Japan, NTS, Inc. (2003).

Representative micromachining methods include LIGA using X-ray lithography, high aspect ratio photolithography using EPON SU-8, micro electric discharge machining (also known as µ-EDM), high aspect ratio machining of silicon based on Deep RIE, hot embossing, stereo lithography, laser machining, ion beam machining, and mechanical micro cutting using a microtool made of a hard material, such as diamond. These methods may be used singly or in combination. Preferred of them are LIGA using X-ray lithography, high aspect ratio photolithography using EPON SU-8, µ-EDM, and mechanical micro cutting.

The microchannels of the classification device may be formed by molding a resin in a mold fabricated on a silicon wafer by using a photoresist. In this case, a silicone resin exemplified by polydimethylsiloxane or its derivative is used as a molding resin.

The classification device of the invention may be fabricated by making use of various bonding techniques. General bonding techniques are roughly divided into solid-phase bonding processes and liquid-phase bonding processes. Typical examples of usually employed bonding methods include pressure welding and diffusion bonding (both of which are solid phase bonding processes), welding, eutectic bonding, soldering, and adhesion (all of which are liquid phase bonding processes).

It is desirable to select a highly precise bonding technique assuring high dimensional accuracy without involving destruction of micro structures, such as microchannels, due to material deterioration or deformation caused by heating at high temperatures. Examples of such a technique include direct silicon bonding, anodic bonding, surface activation bonding, direct bonding using hydrogen bonding, bonding using an aqueous HF solution, Au—Si eutectic bonding, and void-free adhesion.

The classification device of the invention may also be fabricated by building up patterned thin films (layers). The thickness of each patterned layer is preferably 5 to 50 μm, more preferably 10 to 30 μm. The classification device of the invention may be a device fabricated by building up patterned layers having a predetermined two-dimensional pattern. The patterned layers may be directly joined on their planes.

Among the above described methods using a bonding technique is a method including the steps of (1) forming a plurality of patterned layers each corresponding to a cross-sectional shape of a contemplated classification device on a first substrate (donor substrate fabrication step), (2) bringing a second substrate into contact with a patterned layer formed on the first substrate and then releasing the second substrate from the first substrate to transfer the patterned layer to the second substrate (bonding step), and repeating the bonding step for each of the other patterned layers. For the details, reference can be made to, e.g., JP 2006-187684A.

The particle dispersion that is subjected to classification according to the invention contains particles having a larger specific gravity than each of the liquid medium, i.e., the dispersion medium of the particle dispersion and the conveying fluid. The particle dispersion preferably contains particles having a volume average particle size of 0.1 to 1,000 μm, and the difference in specific gravity between the particles and the liquid medium is preferably 0.01 to 20.

The dispersed particles may be of any materials including resins, inorganic substances, metals, and ceramics as long as their volume average particle size ranges from 0.1 to 1000 μm. The volume average particle size of the particles is preferably 0.1 to 1,000 μm, more preferably 0.1 to 500 μm, even more preferably 0.1 to 200 μm, most preferably 0.1 to 50 μm. Particles with a volume average particle size of 1,000 μm or smaller are less likely to cause clogging. Particles with a volume average particle size of 1,000 μm or smaller have an advantageous sedimentation velocity for preventing accumulation on the bottom wall of channels and resulting clogging. Particles with a volume average particle size of 0.1 μm or greater hardly interact with the inner wall of the channels and are thereby prevented from adhering thereto.

Although the particles may have any shape, it can be likely that acicular particles whose length exceeds ¼ the width of any channel cause clogging of the channel. In view of this, the aspect ratio (length to breadth ratio) of the particles is preferably 1 to 50, more preferably 1 to 20. The channel widths are preferably decided according to the size and shape of the particles to be treated.

Types of particles that can be treated in the invention include, but are not limited to, polymer particles, crystals or agglomerates of organic substances (such as pigments) or inorganic substances, metal particles, and particles of metallic compounds, such as metal oxides, metal sulfides, and metal nitrides.

Examples of the polymer of the polymer particles include polyvinyl butyral resins, polyvinyl acetal resins, polyarylate resins, polycarbonate resins, polyester resins, phenoxy resins, polyvinyl chloride resins, polyvinylidene chloride resins, polyvinyl acetate resins, polystyrene resins, acrylic resins, methacrylic resins, styrene-acrylic resins, styrene-methacrylic resins, polyacrylamide resins, polyamide resins, polyvinyl pyridine resins, cellulosic resins, polyurethane resins, epoxy resins, silicone resins, polyvinyl alcohol resins, casein, vinyl chloride-vinyl acetate copolymers, modified vinyl chloride-vinyl acetate copolymers, vinyl chloride-vinyl acetate-maleic anhydride copolymers, styrene-butadiene copolymers, vinylidene chloride-acrylonitrile copolymers, styrene-alkyd resins, and phenol-formaldehyde resins. Composite particles of the polymer described above are also useful. The composite particles contain, in the polymer particles, crystals or agglomerates of an organic compound (e.g., a pigment) or an inorganic compound, metal particles, particles of a metallic compound (e.g., oxide, sulfide, or nitride), or various additives, such as a dispersant and an antioxidant.

Examples of the metal or metallic compound of the particles include carbon black, zinc, aluminum, copper, iron, nickel, chromium, titanium; alloys of these metals; metal oxides, such as $TiO_2$, $SnO_2$, $Sb_2O_3$, $In_2O_3$, ZnO, MgO, and iron oxide, and compounds thereof; metal nitrides, such as silicon nitride; and combinations thereof.

The particles may be produced by a variety of methods. In most cases, particles are synthesized in a liquid medium, and the resulting dispersion is subjected as such to particle classification. Particles obtained by mechanically grinding a massive solid may be dispersed in a liquid medium to make a dispersion to be classified. When the grinding is conducted in a liquid medium, as is often the case, the resulting dispersion is subjected to classification as such.

In the case where powder (particles) prepared by dry process is to be classified, the powder should be dispersed in a liquid medium beforehand. The powder may be dispersed using a sand mill, a colloidal mill, an attritor, a ball mill, Dyno Mill™, a high pressure homogenizer, an ultrasonic homogenizer, CoBall Mill™, a roll mill, and so forth. The dispersing conditions are preferably selected so that the primary particles may not be ground.

As previously stated, the difference in specific gravity between the particles and the liquid medium (difference obtained by subtracting the specific gravity of the liquid medium from that of the particles) is preferably 0.01 to 20. The difference is more preferably 0.05 to 11, even more preferably 0.05 to 4. With the difference being 0.01 or greater, the particles exhibit good sedimentation behavior. With difference being 20 or smaller, the particles are easy to convey.

The liquid medium is preferably chosen so as to give a specific gravity difference from the particles in the range recited above. Examples of suitable liquid media include water, aqueous media, and organic solvent media.

The term "water" as used herein is intended to include ion exchanged water, distilled water, and electrolyzed ionic water. Examples of the organic solvent media include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, toluene, xylene, and mixtures of two or more thereof.

Preference for the liquid medium varies according to the particles. For example, liquid media that are preferably combined with polymer particles, the specific gravity of which generally ranges from about 1.05 to about 1.6, include aqueous media that do not dissolve the particles, organic solvents, such as alcohols and xylene, and acidic or alkaline water. Liquid media that are preferably combined with metal or metallic compound particles, the specific gravity of which generally ranges from about 2 to about 10, include water that does not attack the particles through, e.g., oxidation or reduction, organic solvents, such as alcohols and xylene, and oils.

Preferred combinations of particles and liquid media are a combination of polymer particles and an aqueous medium and a combination of metal or metallic compound particles and a low viscosity oily medium. The combination of polymer particles and an aqueous medium is especially suited. Examples of polymer particles/aqueous medium combinations include styrene-acrylic resin particles/aqueous medium, styrene-methacrylic resin particles/aqueous medium, and polyester resin particles/aqueous medium.

The particle dispersion preferably has a content of particles of 0.01% to 40%, more preferably 0.05% to 25%, by volume. As long as the particle concentration is at least 0.01 vol %, the particles are easy to collect. With the particle concentration not exceeding 40 vol %, channel clogging is prevented.

According to the present invention, good classification accuracy can be achieved even with a particle dispersion having a relatively high particle concentration that has been difficult to classify by conventional techniques. In particular, the invention allows for highly accurate classification of a particle dispersion having a particle concentration of 1.0 vol % or more that has been difficult to classify by a conventional classification method using a pinched channel or a centrifugal force.

As used herein, the term "volume average particle size" denotes a value measured with a Coulter counter TA-II from Coulter Electronics, Inc., except for particles having a particle size of 5 μm or smaller. In the measurement with TA-II Coulter counter, a suitable aperture diameter is chosen according to the particle size level. Particle size measurement for the particles with a particle size of 5 μm or smaller is carried out using a laser diffraction scattering particle size analyzer LA-920 from Horiba, Ltd.

The specific gravity of the particles is measured by a gas displacement technique using a pycnometer Ultrapycnometer 1000 from Yuasa Ionics Co., Ltd. The specific gravity of the liquid medium is measured with a specific gravity measuring kit AD-1653 from A & D Co., Ltd.

The conveying fluid used in the classification method of the invention is a liquid containing no particles to be classified. It is preferred that the conveying fluid be the same as the liquid medium of the particle dispersion. In the case where the conveying fluid is not the same as the liquid medium, the conveying fluid is preferably selected from the examples recited above with respect to the liquid medium.

The same preference for the specific gravity of the liquid medium relative to that of the particles applies to the specific gravity of the conveying fluid.

It is preferred for the particle dispersion to contain a surfactant and/or a pH modifier in addition to the particles and the dispersion medium. Addition of a surfactant and/or a pH modifier is effective in preventing the particles from agglomerating thereby stabilizing the dispersed state of the particles in the classification device. The surfactant and the pH modifier are preferably those which are effective in stabilizing the dispersed state of the particles in the classification device. In particular, the surfactant is adsorbed to the surface of the particles in the dispersion to provide a finely dispersed and stabilized dispersion, whereby the dispersed particles are prevented from agglomerating. The surfactant is also effective in preventing the particles from electrostatically clinging to the inner walls of the channels. The pH modifier controls the pH of the particle dispersion to prevent agglomeration of the particles, thereby allowing for stable classification. Because a desired pH of a particle dispersion to be treated varies according to the size and type of the particles, it is advisable to previously determine the pH value optimum for classification and to select a pH modifier suited for the desired pH adjustment.

The surfactant to be added is not limited and may be selected appropriately according to the particles from among cationic, anionic, amphoteric, and nonionic surfactants. Examples of useful cationic surfactants include quaternary ammonium salts, alkoxylated polyamines, aliphatic amine polyglycol ethers, aliphatic amines, di- and polyamines derived from aliphatic amines and aliphatic alcohols, imidazolines derived from fatty acids, and salts of these cationic substances. The cationic surfactants may be used either individually or in combination of two or more thereof.

Examples of useful anionic surfactants include N-acyl-N-methyltaurine salts, fatty acid salts, alkylsulfuric ester salts, alkylbenzenesulfonic acid salts, alkylnaphthalenesulfonic acid salts, dialkylsulfosuccinic acid salts, alkylphosphoric ester salts, naphthalenesulfonic acid formalin condensates, and polyoxyethylene alkylsulfuric ester salts. Inter alia, N-acyl-N-methyltaurine salts and polyoxyethylene alkylsulfuric ester salts are preferred. The cation forming the salt is preferably an alkali metal cation. These anionic surfactants may be used either individually or in combination of two or more thereof.

Examples of useful nonionic surfactants include polyoxyethylene alkyl ethers, polyoxyethylene alkyl aryl ethers, polyoxyethylene fatty acid esters, sorbitan fatty acid esters, polyoxyethylene sorbitan fatty acid esters, polyoxyethylene alkylamines, and glycerol fatty acid esters. Among them preferred are polyoxyethylene alkyl aryl ethers. These nonionic surfactants may be used either individually or in combination of two or more thereof.

In treating a resin particle dispersion, in particular, it is preferred to use an anionic surfactant, more preferably an N-acyl-N-methyltaurine salt, a fatty acid salt, an alkylsulfuric ester salt, an alkylbenzenesulfonic acid salt, an alkylnaphthalenesulfonic acid salt, an alkylphosphoric ester salt, a polyoxyethylene alkylsulfuric ester salt, or the like.

The amount of the surfactant to be added is preferably, but not limited to, 0.0001% to 20% by weight, more preferably 0.005% to 10% by weight, relative to the total solids content of the particle dispersion so as to ensure the improvement in uniformity and stability of the disperse state.

The pH modifier to be used is selected appropriately from known pH modifiers, such as sodium hydroxide, aqueous ammonia, hydrochloric acid, nitric acid, sulfuric acid, calcium phosphate, calcium hydroxide, sodium hydrogencarbonate, calcium hydrogencarbonate, calcium carbonate, sodium carbonate, citric acid, and lactic acid.

The amount of the pH modifier to be added is preferably 0.0001 to 10 parts, more preferably 0.001 to 1 part, by weight per 100 parts by weight of the particles, so as to ensure prevention of particle agglomeration and to stabilize classification.

The invention will now be illustrated in greater detail with reference to Examples in view of Comparative Examples, but it should be understood that the invention is not deemed to be limited thereto.

Example 1

A classification device incorporating the embodiment of FIG. 1 is fabricated. Two acrylic resin plates of 200 mm (X-axis) by 12 mm (Y-axis) by 40 mm (Z-axis) are provided. The surface of each plate is grooved using an end mill so that the grooved two plates are in mirror symmetry. The plates are screwed together on their grooved surfaces to make a classification device having the following channel geometry.

The device has an auxiliary channel of 0.5 mm (X-axis) by 5.0 mm (Y-axis) by 0.5 mm (Z-axis) on the classification channel in the classification zone. The aspect ratio of the classification channel's width (horizontal dimension) H to vertical dimension V (H/V) on a cross-section perpendicular to the flow in the classification channel is 7/1. The width A of the particle dispersion inlet port as measured perpendicular to the flow in the classification channel on a cross-section taken parallel to the flow in the classification channel (A=0.5 mm) and the width B of the junction between the particle dispersion delivery channel and the classification channel as measured perpendicular to the flow in the classification channel on a cross-section taken parallel to the flow in the classification channel (B=5.0 mm) are in the relationship: A<B. A schematic perspective view of the device is shown in FIG. 1. FIG. 3 is a drawing showing the dimensions of the device.

A particle dispersion and water as a conveying fluid are delivered using the respective syringe pumps PHD2000 from Harvard Apparatus. To avoid particles settling out in the syringe, the classification apparatus is set at an angle of inclination (θ) of 45°, and the syringe is equipped with a stirring bar that is rotated by a magnetic stirrer outside the syringe as illustrated in FIG. 5 so that the particle dispersion may be delivered while being stirred.

A separation test is performed using crosslinked acrylic resin particles MX-300 having an average particle size of 3 μm (hereinafter "3 μm particles") and MX1500H having an average particle size of 15 μm (hereinafter "15 μm particles"), both having a density of 1.19 g/cm³, available from Soken Chemical & Engineering Co., Ltd. The acrylic resin particles are dispersed in water at a mixing weight ratio of 3 μm particles to 15 μm particles of 50:50, and 0.05 parts by weight, per 100 parts by weight of the total resin particles, of sodium dodecylsulfate is added thereto as a surfactant to prepare a particle dispersion R having a solids concentration of 6 wt %. The particle dispersion R and water S are fed to the classification device at an R:S flow rate ratio of 20:200 (ml/hr) to obtain a fine particle fraction T2 from the downstream branched collection channel 2. The particle size distribution of the particles of the fraction T2 is determined to find that the content of particles of 15 μm or greater is 0 vol %, thus confirming the feasibility of separating 3 μm particles and 15 μm particles.

Comparative Example 1

A classification device having no auxiliary channel for particle dispersion shown in FIGS. 10 to 12 is fabricated. The classification channel has dimensions of 150.0 mm (X-axis), 1.0 mm (Y-axis), and 2.0 mm (Z-axis), and each of the two collection channels has a cross-section of 0.5 mm (X-axis) by 1.0 mm (Y-axis). The with (horizontal dimension) H and the vertical dimension V of the classification channel on a cross-section perpendicular to the flow in the classification channel are 1.0 mm and 2.0 mm, giving an aspect ratio (H/V) of 1/2.

The device is set as illustrated in FIG. 6, and a separation test is performed using the same acrylic resin particle dispersion as used in Example 1. When the particle dispersion R and the conveying fluid (water) S are fed at an R:S flow rate ratio of 2:40 (ml/hr), the fine particle fraction T2 collected through the collection channel 2 contains 9.7 vol % of particles of 15 μm or greater, revealing a great reduction in separation performance as compared with Example 1. After 5 minute operation, clogging of the classification channel occurs, making it difficult to further continue the classification operation.

Example 2

A classification device is fabricated in the same manner as in Example 1, except for changing the dimensions of the classification channel to 150.0 mm (X-axis) by 2.0 mm (Y-axis) by 4.0 mm (Z-axis), the dimensions of the auxiliary channel to 0.5 mm (X-axis) by 1.6 mm (Y-axis) by 0.5 mm (Z-axis), and the dimension of each collection channels to 0.5 mm (X-axis) by 2.0 mm (Y-axis). H/V is 2/4=1/2. A (0.5 mm) and B (1.6 mm) satisfy the relationship: A<B. The device is set as illustrated in FIG. 6, and a separation test is performed using the same acrylic resin particle dispersion as used in Example 1. When the particle dispersion R and the conveying fluid (water) S are fed at an R:S flow rate ratio of 5:100 (ml/hr), the fine particle fraction T2 collected through the collection channel 2 contains 3.5 vol % of particles of 15 μm or greater.

Example 3

A classification device is fabricated in the same manner as in Example 1, except for changing the dimensions of the classification channel to 150.0 mm (X-axis) by 12.0 mm (Y-axis) by 1.0 mm (Z-axis), the dimensions of the auxiliary channel to 0.5 mm (X-axis) by 8.0 mm (Y-axis) by 0.5 mm (Z-axis), and the dimension of each collection channels to 0.5 mm (X-axis) by 12.0 mm (Y-axis). H/V is 12/1. A (0.5 mm) and B (8.0 mm) satisfy the relationship: A<B. The device is set as illustrated in FIG. 6, and a separation test is performed using the same acrylic resin particle dispersion as used in Example 1. When the particle dispersion R and the conveying fluid (water) S are fed at an R:S flow rate ratio of 30:300 (ml/hr), the fine particle fraction T2 collected through the collection channel 2 contains only particles around 3 μm with zero content of particles of 15 μm or greater, thus confirming the feasibility of separating particles. However, the concentration of the fine particle fraction T2 is lower than that in Example 1.

Example 4

A classification device is fabricated in the same manner as in Example 1, except for changing the dimensions of the auxiliary channel to 0.5 mm (X-axis) by 0.7 mm (Y-axis) by 0.5 mm (Z-axis). H/V is 7/1. The relationship between A (0.5 mm) and B (0.7 mm) is A<B but 2A>B. The device is set as illustrated in FIG. 6, and a separation test is performed using the same acrylic resin particle dispersion as used in Example 1. When the particle dispersion R and the conveying fluid (water) S are fed at an R:S flow rate ratio of 20:200 (ml/hr), fine particle fraction T2 collected through the collection channel 2 contains 1.2 vol % of particles of 15 μm or greater.

Example 5

A classification device is fabricated in the same manner as in Example 1, except for changing the dimensions of the auxiliary channel to 0.5 mm (X-axis) by 7.0 mm (Y-axis) by 0.5 mm (Z-axis). H/V is 7/1. The relationship between A (0.5 mm) and B (7.0 mm) is A<B. B and H are equal. The device is set as illustrated in FIG. 6, and a separation test is performed using the same acrylic resin particle dispersion as used in Example 1. When the particle dispersion R and the conveying fluid (water) S are fed at an R:S flow rate ratio of 20:200 (ml/hr), the fine particle fraction T2 collected through the collection channel 2 contains 4.5 vol % of particles of 15 μm or greater.

Example 6

Figure 9:
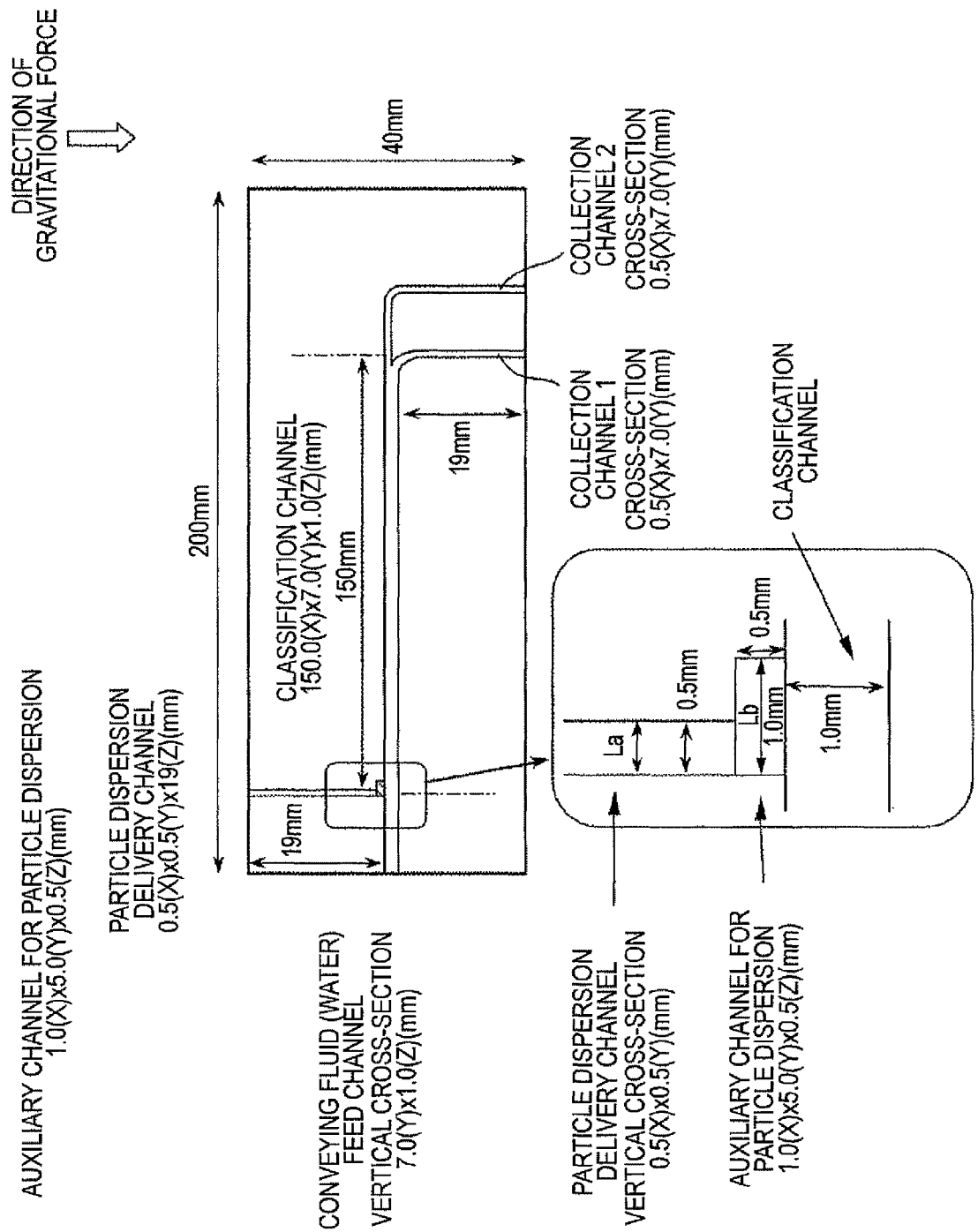
FIG. 9 is a cross-section of still another embodiment of the classification device of the invention.

A classification device having an auxiliary channel illustrated in FIG. 9 is fabricated. The auxiliary channel is designed with its dimension Lb as measured along the flow in the classification channel being larger than the dimension La of the particle dispersion delivery channel measured along the flow in the classification channel. That is, La=0.5 mm, and Lb=2.0 mm.

The classification apparatus is set at an angle of inclination (θ) of 45°. A separation test is performed in the same manner as in Example 1. When the particle dispersion R and the conveying fluid (water) S are fed at an R:S flow rate ratio of 20:200 (ml/hr), the fine particle fraction T2 collected through the collection channel 2 contains 3.3 vol % of particles of 15 μm or greater, revealing a reduction in performance of separating 3 μm particles and 15 μm particles as compared with Example 1. In this way, when Lb is larger than La, the particle dispersion is introduced into the classification channel before it is sufficiently diffused to allow the dispersed particles to settle out, resulting in reduced classification accuracy. Thus, it is preferred that La and Lb be in the relationship: Lb≦La.

Example 7

A separation test is performed in the same manner as in Example 1, except that the angle of inclination θ of the classification device is 0° and that the flow rate ratio of particle dispersion S to conveying fluid (water) R, R:S, is 10:190 (ml/hr). No clogging of any channel is observed in a continuous 3 hour operation. The fine particle fraction T2 from collection channel 2 is freed of particles of 15 μm or greater, proving the feasibility of separating 3 μM particles and 15 μm particles.

Comparative Example 2

A separation test is performed in the same manner as in Comparative Example 1, except that the angle of inclination θ of the classification device is 0°. After one minute operation, clogging of the classification channel occurs, making continuous classification difficult.

The above described results are shown in Table 1.

total resin particles. The blend is dispersed in ion exchanged water to prepare a particle dispersion R having a solids concentration of 9.2%. The particle dispersion R exhibits a particle size distribution having a big peak of 5 μm and two small peaks of 10 μm and 20 μm as measured with a Coulter counter TA-II. The particle dispersion R is subjected to classification using a classification device illustrated in FIG. 7 which has an auxiliary channel and has each of the particle dispersion delivery channel and the collection channels inclined at an angle θ of 45° with respect to the classification channel. The classification device is set at an angle of inclination θ of 45° with respect to the horizontal as illustrated in FIG. 8.

The particle size distribution of the particles in the fine particle fraction T2 as determined with Coulter counter TA-II has a small peak at 10 μm and a large peak at 5 μm with no peak of 20 μm, showing zero content of particles of 20 μm or greater.

Comparative Example 3

A separation test is performed using the same resin particle dispersion R as used in Example 8 and the same classification device as used in Comparative Example 1 (shown in FIGS. 10 through 12). The classification device is set at an angle of inclination of 45° as illustrated in FIG. 6. As a result of particle size distribution analysis of the fine particle fraction T2 from the collection channel 2 using a Coulter counter TA-II, the fine particle fraction T2 contained 4.6 vol % of particles of 20 μm or greater, indicating reduction in particle separating performance as compared with Example 8.

Example 9

A classification device of the same design as in Example 1 is fabricated, except that the junction between the particle dispersion delivery channel and the auxiliary channel is tapered as illustrated in FIG. 4A and that the auxiliary channel

TABLE 1

| | Particle Dispersion Delivery Channel (mm) | | | Auxiliary Channel (mm) | | | Classification Channel (mm) | | | A and B Relationship | H to V Relationship | Flow Rate Ratio R/S (ml/h) | Angle θ of Inclination (°) | Content of ≧15 μm Particles in Fine Particle Fraction T2 (vol %) | Remark |
|---|---|---|---|---|---|---|---|---|---|---|---|---|---|---|---|
| | X (La) | Y (A) | Z | X (Lb) | Y (B) | Z | X | Y (H) | Z (V) | | | | | | |
| Ex. 1 | 0.5 | 0.5 | 19 | 0.5 | 5 | 0.5 | 150 | 7 | 1 | A < B | 7/1 | 20/200 | 45 | 0 | — |
| Comp. Ex. 1 | 0.5 | 0.5 | 19 | — | — | — | 150 | 1 | 2 | — | 1/2 | 2/40 | 45 | 9.7 (clogging after 5 rains) | no auxiliary channel |
| Ex. 2 | 0.5 | 0.5 | 19 | 0.5 | 1.6 | 0.5 | 150 | 2 | 4 | A < B | 1/2 | 5/100 | 45 | 3.5 | H/V ≦ 1/1 |
| Ex. 3 | 0.5 | 0.5 | 19 | 0.5 | 8 | 0.5 | 150 | 12 | 1 | A < B | 12/1 | 30/300 | 45 | 0 | H/V ≧ 10/1 |
| Ex. 4 | 0.5 | 0.5 | 19 | 0.5 | 0.7 | 0.5 | 150 | 7 | 1 | A < B | 7/1 | 20/200 | 45 | 1.2 | 2A > B |
| Ex. 5 | 0.5 | 0.5 | 19 | 0.5 | 7 | 0.5 | 150 | 7 | 1 | A < B | 7/1 | 20/200 | 45 | 4.5 | B = H |
| Ex. 6 | 0.5 | 0.5 | 19 | 2 | 5 | 0.5 | 150 | 7 | 1 | A < B | 7/1 | 20/200 | 45 | 3.3 | Lb > La |
| Ex. 7 | 0.5 | 0.5 | 19 | 0.5 | 5 | 0.5 | 150 | 7 | 1 | A < B | 7/1 | 10/140 | 0 | 0 | — |
| Comp. Ex. 2 | 0.5 | 0.5 | 19 | — | — | — | 150 | 1 | 2 | — | 1/2 | 2/40 | 0 | clogging after 1 min | no auxiliary channel |

Example 8

A separation test is performed using styrene-n-butyl acrylate resin (75:25; weight average molecular weight: 35,000) particle having average particle sizes of 5 μm, 10 μm, and 20 μm, all having a density of 1.08 g/cm³. The resin particles having different average particles are blended at a 5 mμ:10 μm:20 μm volume ratio of 8:1:1, and 0.03 parts by weight of N-oleoyl-N-methyltaurine sodium salt (as a surfactant) and 0.02 parts by weight of sodium hydrogencarbonate (as a pH modifier) are added thereto per 100 parts by weight of the has dimensions of 0.4 mm (X-axis) by 5.0 mm (Y-axis) by 0.5 mm (Z-axis). Accordingly, La=0.5 mm, and Lb=0.4 mm. The device is set as illustrated in FIG. 6, and a separation test is performed using the same resin particle dispersion as used in Example 8. When the particle dispersion R and the conveying fluid (water) S are fed at an R:S flow rate ratio of 20:200 (ml/hr), the particle size distribution of the particles in fine particle fraction T2 from the branched collection channel 2 shows zero content of particles of 20 μm or greater, a small peak of 10 μm, and a large peak of 5 μm with no peak at 20 μm similarly to the results of Example 1.

Example 10

The same separation test as in Example 9 is performed, except that the junction between the particle dispersion delivery channel and the auxiliary channel is tapered as illustrated in FIG. 4B. As a result, the fine particle fraction T2 from the branched collection channel 2 contains no particles of 20 μm or greater. The particle size distribution of the fraction T2 shows a small peak at 10 μm, a large peak at 5 μm, and no peak at 20 μm similarly to the results of Example 9.

Example 11

The same separation test as in Example 8 is carried out, except that the surfactant, N-oleoyl-N-methyltaurine sodium salt, is not added to the particle dispersion. As a result, the fine particle fraction T2 from the branched collection channel 2 contains 0.6 vol % of particles of 20 μm or greater, showing slight reduction in performance of removing coarse particles as compared with Example 8.

Example 12

The same separation test as in Example 8 is carried out, except that the pH modifier, sodium hydrogencarbonate, is not added to the particle dispersion. As a result, the fine particle fraction T2 from the branched collection channel 2 contains 0.8 vol % of particles of 20 μm or greater, showing slight reduction in performance of removing coarse particles as compared with Example 8.

Example 13

The same separation test as in Example 8 is carried out, except that neither the surfactant, N-oleoyl-N-methyltaurine sodium salt, nor the pH modifier, sodium hydrogencarbonate, are added to the particle dispersion. As a result, the fine particle fraction T2 from the branched collection channel 2 contains 1.7 vol % of particles of 20 μm or greater, showing slight reduction in performance of removing coarse particles as compared with Example 8.

The results obtained in Examples 8 through 13 and Comparative Example 3 are shown in Table 2 below.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A classification device comprising:
a classification channel for classifying particles;
a particle dispersion delivery channel for delivering a particle dispersion to an upper stream in the classification channel, the particle dispersion delivery channel having a particle dispersion inlet port for introducing the particle dispersion at one end thereof with the other end thereof communicating with the classification channel at a junction;
a conveying fluid feed channel for introducing a conveying fluid to a lower stream in the classification channel, the conveying fluid feed channel having an opening for introducing the conveying fluid at one end thereof and the other end communicating with the classification channel; and
at least one collection channel for collecting separated particles, the collection channel having an opening at one end thereof with the other end communicating with the classification channel,
the particle dispersion delivery channel satisfying relationship (1):

$$A < B$$

wherein A is a width of the particle dispersion inlet port as measured perpendicular to the flow in the classification channel on a cross-section taken parallel to the flow in the classification channel; and B is a width of the junction between the particle dispersion delivery channel and the classification channel as measured

TABLE 2

| | Particle Dispersion Delivery Channel (mm) | | | Auxiliary Channel (mm) | | | Classification Channel (mm) | | | A and B Relation-ship | H to V Relation-ship | Flow Rate Ratio R/S (ml/h) | Angle θ of Incli-nation (°) | Content of ≧20 μm Particles in Fine Particle Fraction T2 (vol %) | Remark |
|---|---|---|---|---|---|---|---|---|---|---|---|---|---|---|---|
| | X (La) | Y (A) | Z | X (Lb) | Y (B) | 2 | X | Y (H) | Z (V) | | | | | | |
| Ex. 8 | 0.5 | 0.5 | 19 | 0.5 | 5 | 0.5 | 150 | 7 | 1 | A < B | 7/1 | 20/200 | 45 | 0 | surfactant and pH modifier added |
| Comp. Ex. 3 | 0.5 | 0.5 | 19 | — | — | — | 150 | 1 | 2 | — | 1/2 | 2/40 | 45 | 4.6 | no auxiliary channel |
| Ex. 9 | 0.5 | 0.5 | 19 | 0.4 | 5 | 0.5 | 150 | 7 | 1 | A < B | 7/1 | 20/200 | 45 | 0 | Lb < La, tapered |
| Ex. 10 | 0.5 | 0.5 | 19 | 0.4 | 5 | 0.5 | 150 | 7 | 1 | A < B | 7/1 | 20/200 | 45 | 0 | Lb < La, tapered |
| Ex. 11 | 0.5 | 0.5 | 19 | 0.5 | 5 | 0.5 | 150 | 7 | 1 | A < B | 7/1 | 20/200 | 45 | 0.6 | pH modifier added |
| Ex. 12 | 0.5 | 0.5 | 19 | 0.5 | 5 | 0.5 | 150 | 7 | 1 | A < B | 7/1 | 20/200 | 45 | 0.8 | surfactant added |
| Ex. 13 | 0.5 | 0.5 | 19 | 0.5 | 5 | 0.5 | 150 | 7 | 1 | A < B | 7/1 | 20/200 | 45 | 1.7 | neither surfactant nor pH modifier added | perpendicular to the flow in the classification channel on a cross-section taken parallel to the flow in the classification channel, wherein A, B, and H satisfy relationship (3):

$$2A<B<H$$

wherein H is a dimension measured in the horizontal direction on a cross-section of the classification channel taken perpendicular to the flow in the classification channel.

2. The classification device according to claim 1, wherein the classification channel satisfies relationship (2):

$$1/1<H/V<10/1$$

wherein V is a dimension measured in the vertical direction on a cross-section of the classification channel taken perpendicular to the flow in the classification channel.

3. The classification device according to claim 1, wherein the classification channel satisfies relationship (2):

$$1.5/1<H/V<9.5/1$$

wherein V is a dimension measured in the vertical direction on a cross-section of the classification channel taken perpendicular to the flow in the classification channel.

4. The classification device according to claim 2, wherein the V is about 10 to about 5,000 μm.

5. The classification device according to claim 1, wherein A is 1/2.2 or less times B.

6. The classification device according to claim 1, wherein A is 1/2.5 or less times B.

7. The classification device according to claim 1, wherein B is 0.95 or less times H.

8. The classification device according to claim 1, wherein B is 0.9 or less times H.

9. The classification device according to claim 1, wherein dimension La of the particle dispersion inlet port as measured along the flow in the classification channel on the cross-section taken parallel to the flow in the classification channel and dimension Lb of the junction between the particle dispersion delivery channel and the classification channel as measured along the flow in the classification channel on a cross-section taken parallel to the flow in the classification channel satisfy relationship (4):

$$Lb \leq La.$$

10. The classification device according to claim 9, wherein the particle dispersion delivery channel is tapered toward the junction to have its width increased from A to B.

11. The classification device according to claim 1, wherein the classification channel has an angle θ larger than 0° and smaller than 90° with respect to the horizontal, and at least one of the particle dispersion delivery channel and the at least one collection channel has an angle of inclination with respect to the horizontal so as to provide a downward flow of liquid.

12. The classification device according to claim 11, wherein the downward flow in the particle dispersion delivery channel has an angle of inclination greater than 0° and not greater than 135° with the horizontal angle taken as 0° and the angle of the direction of gravitational force as 90°.

13. The classification device according to claim 11, wherein the downward flow in the particle dispersion delivery channel is in the direction of gravitational force.

14. The classification device according to claim 11, wherein the downward flow in the at least one collection channel has an angle of inclination greater than 0° and not greater than 90° with the horizontal angle taken as 0° and the angle of the direction of gravitational force as 90°.

15. A method of classifying particles in a particle dispersion comprising: treating the particle dispersion with a classification device according to the classification device of claim 1.

16. The method according to claim 15, wherein the particle dispersion comprises at least one of a surfactant and a pH modifier.

* * * * *